United States Patent
Lee et al.

(10) Patent No.: US 7,468,595 B2
(45) Date of Patent: Dec. 23, 2008

(54) SYSTEM AND METHOD OF CONTROLLING THE START-UP OF AN ADJUSTABLE SPEED MOTOR DRIVE BASED SINUSOIDAL OUTPUT POWER CONDITIONER

(75) Inventors: Kevin Lee, Menomonee Falls, WI (US);
Jyrki K. Ahlgren, Franksville, WI (US);
Ian T. Wallace, Whitefish Bay, WI (US);
Thomas M. Doring, Grafton, WI (US)

(73) Assignee: Eaton Corporation, Cleveland, OH (US)

( * ) Notice: Subject to any disclaimer, the term of this patent is extended or adjusted under 35 U.S.C. 154(b) by 150 days.

(21) Appl. No.: 11/161,200

(22) Filed: Jul. 26, 2005

(65) Prior Publication Data

US 2007/0024231 A1 Feb. 1, 2007

(51) Int. Cl.
*H02P 5/34* (2006.01)
*H02P 7/36* (2006.01)
*H02P 7/42* (2006.01)

(52) U.S. Cl. .................. 318/802; 318/801; 318/807; 318/809

(58) Field of Classification Search ................. 318/430, 318/700, 701, 759, 802, 807, 778, 808, 779, 318/798, 801, 803, 809; 322/22; 327/175; 363/37, 40, 71

See application file for complete search history.

(56) References Cited

U.S. PATENT DOCUMENTS

| | | | | |
|---|---|---|---|---|
| 3,584,279 A | * | 6/1971 | Krauthamer et al. | 318/808 |
| 3,819,992 A | * | 6/1974 | Opal et al. | 318/798 |
| 4,334,267 A | * | 6/1982 | Miko | 363/133 |
| 4,612,610 A | * | 9/1986 | Farnsworth et al. | 363/21.13 |
| 4,619,023 A | * | 10/1986 | Tsubokawa | 24/394 |
| 4,888,461 A | * | 12/1989 | Takano et al. | 219/716 |
| 5,003,242 A | * | 3/1991 | Liber | 318/778 |
| 5,142,468 A | * | 8/1992 | Nerem | 363/71 |
| 5,350,992 A | * | 9/1994 | Colter | 318/807 |
| 5,461,296 A | * | 10/1995 | Messersmith et al. | 318/779 |
| 5,703,767 A | * | 12/1997 | Stacey | 363/40 |
| 5,781,422 A | * | 7/1998 | Lavin et al. | 363/37 |
| 5,793,623 A | * | 8/1998 | Kawashima et al. | 363/56.05 |
| 5,959,431 A | * | 9/1999 | Xiang | 318/811 |
| 6,072,302 A | * | 6/2000 | Underwood et al. | 322/17 |
| 6,150,776 A | * | 11/2000 | Potter et al. | 318/139 |
| 6,307,275 B1 | * | 10/2001 | Cheng | 290/27 |
| 6,380,719 B2 | * | 4/2002 | Underwood et al. | 322/36 |

(Continued)

OTHER PUBLICATIONS

R. D. Lorenz et al., "Motion Control with Induction Motors," IEEE Proceedings special issue on Power Electronics and Motion Control, vol. 82, No. 8, pp. 1215-1240, Aug. 1994.

(Continued)

*Primary Examiner*—Paul Ip
(74) *Attorney, Agent, or Firm*—Ziolkowski Patent Solutions Group, SC

(57) ABSTRACT

A motor drive for conditioning power to be delivered to a load includes a current feedback circuit that monitors current being fed to a transformer connected between the motor drive and the load. Based on the total current input to the transformer, a controller adjusts the V/Hz profile along which the motor drive operates. In this regard, the motor drive operates according to a V/Hz profile during start-up that prevents transformer saturation.

25 Claims, 4 Drawing Sheets

U.S. PATENT DOCUMENTS

| | | | |
|---|---|---|---|
| 6,429,612 B1 * | 8/2002 | Kume et al. | 318/139 |
| 6,429,709 B1 * | 8/2002 | Hall et al. | 327/175 |
| 6,492,789 B2 * | 12/2002 | Cheng | 318/700 |
| 6,501,244 B2 * | 12/2002 | Cheng | 318/701 |
| 6,597,221 B2 * | 7/2003 | Hall et al. | 327/175 |
| 6,636,011 B2 * | 10/2003 | Sadasivam et al. | 318/727 |
| 6,768,284 B2 * | 7/2004 | Lee et al. | 318/808 |
| 6,781,802 B2 * | 8/2004 | Kato et al. | 361/22 |
| 6,801,013 B2 * | 10/2004 | Woodward et al. | 318/804 |
| 6,807,074 B2 | 10/2004 | Ollila et al. | |
| 6,917,124 B2 * | 7/2005 | Shetler et al. | 307/66 |
| 6,952,088 B2 * | 10/2005 | Woodward et al. | 318/430 |
| 2001/0019253 A1 * | 9/2001 | Hammond et al. | 318/759 |
| 2002/0047681 A1 * | 4/2002 | Cheng | 318/700 |
| 2002/0047682 A1 * | 4/2002 | Cheng | 318/701 |
| 2003/0048006 A1 * | 3/2003 | Shelter et al. | 307/64 |
| 2003/0107348 A1 * | 6/2003 | Inagawa et al. | 322/22 |
| 2004/0041404 A1 * | 3/2004 | McConnell | 290/52 |
| 2004/0062062 A1 * | 4/2004 | Lee et al. | 363/37 |

OTHER PUBLICATIONS

J. Holtz, "Sensorless Control of Induction Motor Device," IEEE Proceedings, vol. 90, No. 8, pp. 1359-1394, Aug. 2002.

S. Karve, "Three of a Kind," IEE Review, pp. 27-31, Mar. 2000.

L. Gyugyi, "Unified Power-Flow Control Concept for Flexible AC Transmission Systems," IEEE Proceedings-C, vol. 139, No. 4, pp. 323-331, Jul. 1992.

H. Akagi, "New Trends in Active Filters for Power Conditioning," IEEE Trans. On Industry Applications, vol. 32, No. 6, pp. 1312-1322, Nov./Dec. 1996.

S. B. Bekiarov et al., "Uninterruptible Power Supplies: Classification, Operation, Dynamics, and Control," IEEE/APEC 2002, vol. 1, pp. 597-604, Mar. 2002.

S. Ponnaluri et al., "Overriding Individual Harmonic Current Control with Fast Dyanmics for UPS with Non-Linear Loads," IEEE International Conference on Power Electronics and Drive Systems, vol. 2, pp. 527-532, Oct. 2001.

M. J. Ryan et al., "Control Topology Options for Single-Phase UPS Inverters," IEEE Trans. On Industry Applications, vol. 33, No. 2, pp. 493-501, Mar./Apr. 1997.

M. J. Ryan et al., "A High Performance Sine Wave Inverter Controller with Capacitor Current Feedback and 'Back-EMF' Decoupling," IEEE PESC Conference Proceedings, pp. 507-513, Atlanta, GA 1995.

Vacon NC Tools Manual, 2005.

* cited by examiner

SYSTEM AND METHOD OF CONTROLLING THE START-UP OF AN ADJUSTABLE SPEED MOTOR DRIVE BASED SINUSOIDAL OUTPUT POWER CONDITIONER

BACKGROUND OF THE INVENTION

The present invention relates generally to power conditioning and, more particularly, to a system and method of controlling a motor drive.

Motor drives are frequently used in industrial applications to condition power and otherwise control electric driven motors such as those found with pumps, fans, compressors, cranes, paper mills, steel mills, rolling mills, elevators, machine tools, and the like. Motor drives typically provide a volts-per-hertz control and have greatly improved the efficiency and productivity of electric driven motors and applications. Increasingly, motor drives are taking the form of adjustable-speed drives (ASD) that are adept at providing variable speed and/or variable torque control to an electric driven motor. Heretofore, motor drives have been used solely to control or otherwise condition power to a motor load.

Power to non-motor loads is usually controlled through a power conditioner that is specifically designed to handle the transient load conditions that can be encountered. However, current power conditioners often trip, or cause the load to trip, when strict voltage and current constraints are not met. That is, for non-motor loads, a transformer is often connected between the power conditioner and the load and is used to account for any drops in voltage that occur during conditioning by the power conditioner. At start-up of the power conditioner, it is not uncommon for the transformer to become saturated and, thus, fail as a result of SCR failure or control problems.

That is, it is not uncommon for a DC bias to develop in the transformer. This occurs when one side of the sine wave input to the transformer becomes larger than other. For example, given that one SCR is firing at 60% and the other SCR is firing at only 40%, a 20% bias forms on the first cycle. Since the bias is additive, a 40% bias forms on the second cycle, 60% of the third, 80% of the fourth, and 100% on the $5^{th}$. As a result, the transformer becomes saturated; although, symptoms of saturation may begin to surface at 70% saturation.

This saturation can cause damage to the transformer. Specifically, the polarity of the primary and secondary windings becomes the same, i.e. the transformer core becomes biased to one side only and the windings take the other side. With the same polarity, the primary and secondary windings try to force themselves away from one another. If this condition is maintained, the transformer will fail.

Transformer saturation also yields extremely high primary currents coupled with a decrease in secondary voltage. Under normal conditions, the dominant load on the primary line is the secondary winding of the transformer. Once the transformer is saturated, the transformer core also begins to act as a load. As the core loads the primary winding, the secondary winding becomes less of a load and, as a result, a drop in secondary voltage can be observed.

Also, given that saturation increases exponentially, at total saturation, the transformer core is unable to present any more of a load to the line. As such, little, if any, secondary current is present. In this regard, the primary winding becomes a short circuit which will either trip a circuit breaker or blow a fuse in the system. In any event, undesirable system failure occurs.

Saturation of the transformer can be particularly problematic during start-up of the power conditioner. Power conditioners typically include a series of switches, such as IGBTs, that are switched at high frequencies, e.g., 10 kHz, to provide a desired output voltage that is seen by the load. Further, power conditioners operate according to a volts-per-hertz (V/Hz) profile such that voltage changes can be exacted by varying the duty cycle and fundamental frequency of the IGBTs or other switch circuit. During start-up, the controller will control the IGBT switching duty cycles such that the power conditioner quickly ramps up to steady-state levels. More specifically, when the power conditioner is turned ON, it is generally desirable to control the power conditioner to provide a steady-state output (voltage and frequency of operation) as quickly as possible. As such, the V/Hz curve along which the power conditioner operates is adhered to during steady-state operation, but ignored during start-up. As a result, the power conditioner may provide an output to the transformer that causes a DC bias to develop in the transformer. As described above, this DC bias can cause transformer saturation and, ultimately, component or system failure. That is, flux may develop in the transformer core that causes transformer saturation. It is generally recognized that the flux in a transformer can be defined by the following expression:

$$B_{max} = \frac{E_{RMS}}{4.44 \cdot S \cdot N \cdot f},$$

(Eqn. 1), where:
$B_{max}$ Core induction (T)
$E_{RMS}$ RMS voltage (V)
S Core cross section ($m^2$)
N Number of Turns
f Frequency (Hz).

As "S" and "N" are fixed for a given transformer, only two variable "$E_{RMS}$" and "f vary and must be controlled. Thus, if voltage increases at a much faster rate than frequency then saturation can occur. In other words, voltage and frequency must be matched to maintain a desired flux level.

It would therefore be desirable to have a cost-effective system and method of controlling a power conditioner connected a non-motor load to prevent transformer saturation during power conditioner start-up.

BRIEF DESCRIPTION OF THE INVENTION

The present invention provides a system and method of controlling a power conditioner connected to a load that overcomes the aforementioned drawbacks.

A motor drive for conditioning power to be delivered to a load includes a current feedback circuit that monitors current being fed to a transformer connected between the motor drive and the load. Based on the total current input to the transformer, a controller adjusts the V/Hz profile along which the motor drive operates. In this regard, the motor drive operates according to a V/Hz profile during start-up that prevents transformer saturation.

Therefore, in accordance with one aspect, the present invention includes a motor drive configured to supply power to a load and, during start-up, supply power to the load according to a given V/Hz profile. The motor drive includes an inverter designed to provide power to a load and a controller operationally connected to control operation of the inverter. The controller is configured to cause the inverter to operate at motor drive start-up according to a default V/Hz profile and receive feedback of load voltage during motor drive start-up and control operation of the inverter to reduce a difference between load voltage and a desired load voltage. The controller is further configured to receive feedback of inverter output current, and if the inverter output current exceeds a threshold, cause the inverter to operate according to a new V/Hz profile different from the default V/Hz profile. Otherwise, the controller causes the inverter to operate according to the default V/Hz profile.

In accordance with another aspect of the invention, a power conditioner is presented and designed to supply conditioned power to a load. The power conditioner includes a DC bus, an inverter connected to the DC bus, and a transformer connected to the inverter. The transformer step-ups an output of the inverter and provides the stepped-up output to a load. The power conditioner further includes a controller that receives feedback of inverter output current and regulates the inverter to prevent current saturation of the transformer during transition of the power conditioner from an initial state to steady-state.

According to another aspect of the invention, a method of regulating power to a load comprising the steps of initially providing power to a load according to a default V/Hz profile and monitoring output current of an inverter of a motor drive connected to the non-motor load. The method further includes the step of causing the inverter to provide power according to a new V/Hz profile if the output current of the inverter exceeds a current limit.

Various other features and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION OF THE PREFERRED EMBODIMENT

Figure 1:
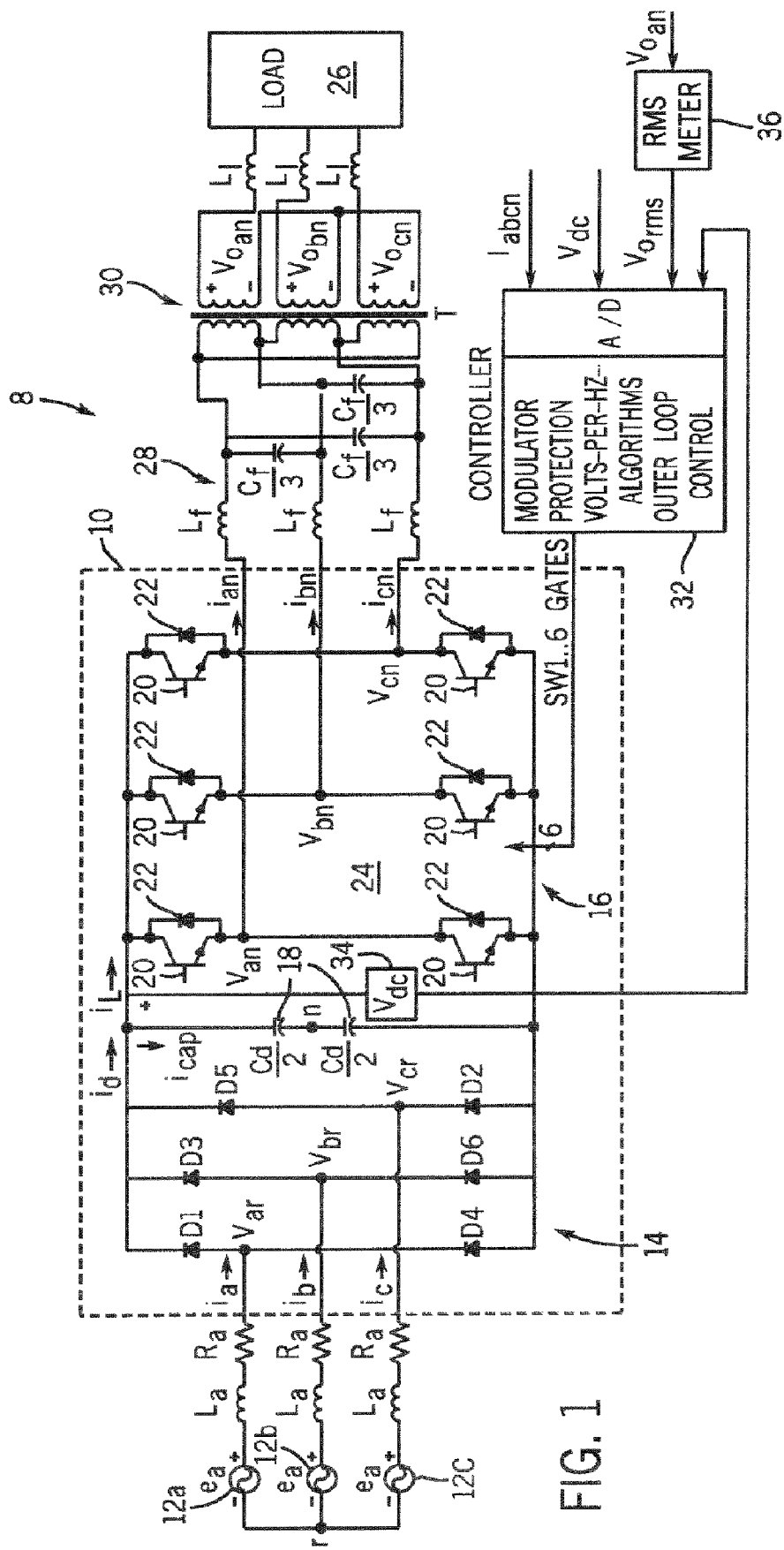
FIG. 1 is a schematic of a power conditioner including a motor drive, step-up transformer, and controller according to one aspect of the invention.

Referring now to FIG. 1, a power conditioner 8 having an adjustable speed motor drive 10 is shown. The adjustable speed drive (ASD) is designed to receive a three AC power input, rectify the AC input, and perform a DC/AC conversion of the rectified segment into a three-phase alternating voltage of variable frequency and amplitude that is supplied to a load. In a preferred embodiment, the ASD operates according to an exemplary V/Hz characteristic. The motor drive provides voltage regulation of ±1% in steady state with less than 3% total harmonic distortion, ±0.1 Hz in output frequency, and fast dynamic step load response over a full load range. It is contemplated that the motor drive is to be used as a fixed frequency/fixed voltage sinusoidal voltage conditioner and, as such, may be connected to a motor load, a non-motor load, a linear load, a non-linear load, motors operating at line frequency and voltage, a transformer coupled load, and the like. Hereinafter, for purposes of illustration, the motor drive will be described as being used to control power to a non-motor load.

In an exemplary embodiment, a three-phase AC input 12a-12c is fed to a three-phase rectifier bridge 14. The input line impedances are equal in all three phases. The rectifier bridge 14 converts the AC power input to a DC power such that a DC bus voltage is present between the rectifier bridge 14 and a switch array 16. The bus voltage is smoothed by a DC bus capacitor bank 18. The switch array 16 is comprised of a series of IGBT switches 20 and anti-parallel diodes 22 that collectively form a PWM inverter 24. The inverter synthesizes AC voltage waveforms with a fixed frequency and amplitude for delivery to the load 26, such as an MR or CT scanner, through LC filter network 28 and step-up transformer 30. In a preferred embodiment, the rectifier bridge sees a 480V input and the inverter 24 provides less than or equal to a 460V output. As such, step-up transformer 30 is used to elevate the load voltage to 480V. The filter network 28 smoothes the output voltage and current waveforms and the low impedance. Delta-Wye step-up transformer provides a boost to allow for longer ride through due to input voltage sags. Operation of the inverter 24 is via controller 32.

Controller 32 is preferably a PID controller and includes a system layer and a programmable application layer. The system layer performs high speed operations such as space-vector modulation, DC bus voltage decoupling, and protection. The system layer also interfaces to the power circuit via gate drive signals and sensing of the DC bus voltage and pole currents. In this regard, the motor drive 10 includes a voltage sensor 34 that provides feedback to the controller 32 of the DC bus voltage. Changes in DC bus voltage are interpreted as transient load conditions and are used to control switching of the switch array such that near steady-state load conditions are maintained. The application layer is operated at a lower update rate and performs functions such as the sampling of user I/O, executing a V/Hz profile, and reference signal generation.

Load voltage is sensed with a true RMS voltmeter 36 that converts a measured 0-600V signal into a 0-10V reference signal that is fed back to the controller 32 for closed loop voltage control. The load voltage and frequency are preferably regulated to be within ±1% of 480V and ±0.1 Hz at 60 Hz. In light of the relatively slow and finite response time of the RMS voltmeter 36, additional control is achieved using the feedback from DC bus voltage sensor 34. Given the DC bus voltage will experience a change in response to a step load transient condition, feedback from the DC bus provides a derivative term that can be considered by the PID controller to forecast the impact of changing load conditions and, thus, effectuate changes in the PWM control such that near steady-state load conditions are maintained. The motor drive 10 also utilizes active damping techniques to reduce output voltage waveform oscillations. Further, the motor drive is designed to achieve load voltage regulation of ±1% in steady state with less than 3% total harmonic distortion, ±0.1 Hz in output frequency, and fast dynamic step load response over a full load range.

As described above, motor drive 10 operates as a power conditioner and whose operation is controlled by a PID controller. The PID controller receives feedback regarding DC bus voltage and, as such, the motor drive has a closed loop control. In this regard, step changes in the non-motor load can be detected as changes in the DC bus voltage. Moreover, as a result of the rapid response time of the voltage sensor, corrective measures can be taken quickly. In other words, the derivative term provided from the voltage sensor to the PID controller enables the PID controller to detect a trend at the load and develop a corrective measure in the power conditioning such that further trending is prevented and near steady-state load conditions can be maintained. Additionally, because the load voltage typically has a high ripple effect in non-motor applications, deriving the derivative term from the load voltage is not preferred. The high ripple effects in the load voltage create instability in the derivative term and, thus, deriving the derivative term from changes in the DC bus voltage is preferred.

The PID controller generally provides three-way functionality. The PID controller provides proportional, integral, and derivative regulation. As described above, derivative regulation defines the controller's ability to detect trends in load conditions and determine corrective measures rather quickly such that near steady-state conditions are maintained in response to transitions at the load. The proportional functionality of the controller defines the controller's ability to quickly respond to changing operating conditions. In short, the proportional functionality defines the controller's response time. The integral functionality defines the controller's ability to maintain steady-state during non-transient load conditions. In this regard, load voltage feedback from the RMS voltmeter is used by the PID controller during non-transient load conditions to maintain steady-state within a given error threshold.

The PID controller not only is designed to control the motor drive such that desirous output conditions are maintained when transient load conditions are experienced, but the controller is also designed to control the motor drive during start-up to prevent transformer saturation. That is, when the motor drive is turned ON, the motor drive will ramp up to provide output at an initial frequency to a rated frequency, e.g. 0 Hz to 60 Hz. As the output frequency is ramped up, the controller will also control the motor drive to provide power at a desired output voltage while not causing saturation currents to be input to the transformer.

Figure 2:
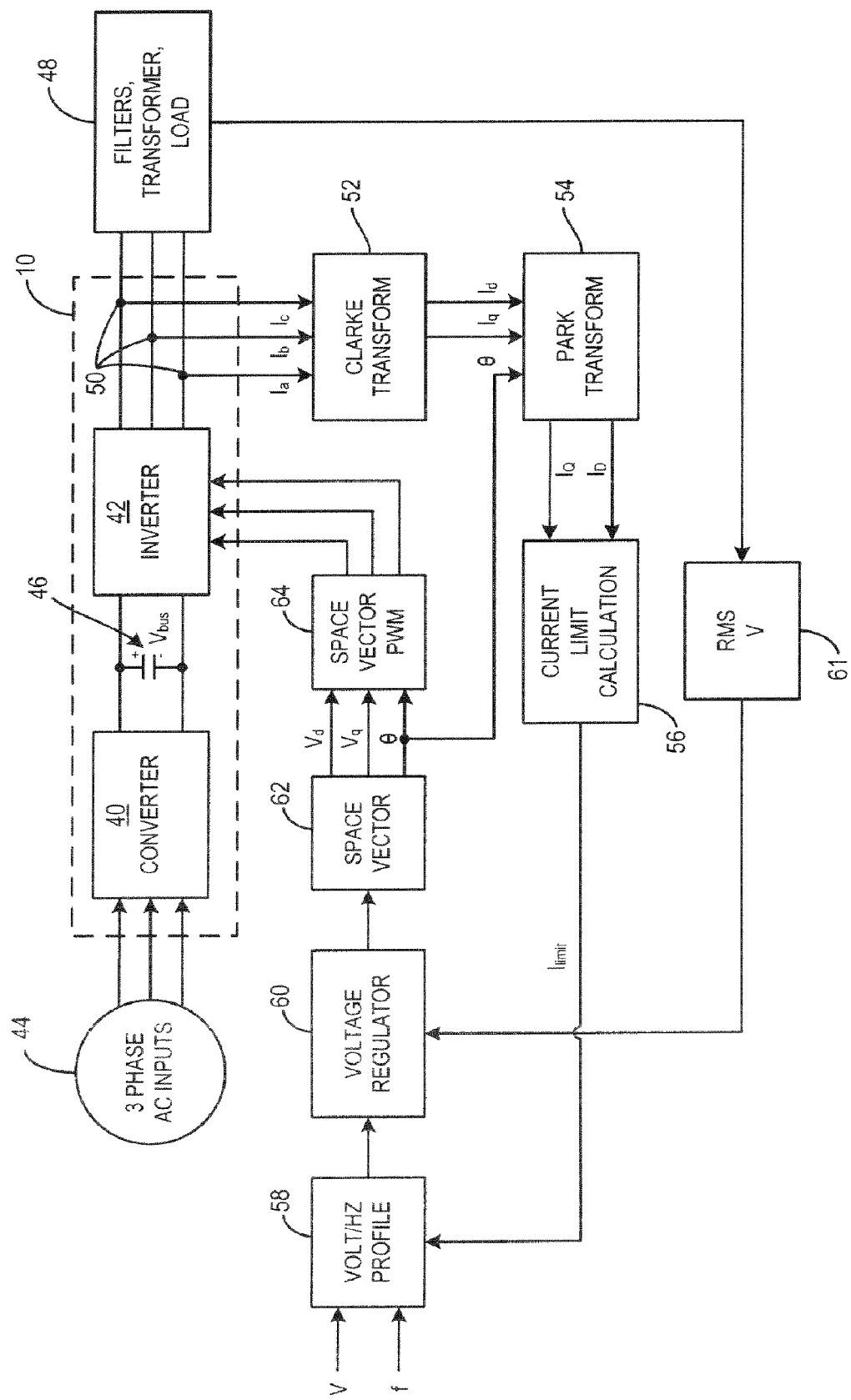
FIG. 2 is a block diagram of a control system for controlling the motor drive shown in FIG. 1 during start-up according to the present invention.

Referring now to FIG. 2, a block diagram of a control system for controlling the motor drive shown in FIG. 1 during start-up according to the present invention is shown. As will be described, controller 32, FIG. 1, determines a current limit value from output currents of the motor drive and controls the motor drive accordingly. Specifically, the motor drive 10, which generally includes an AC/DC converter 40 and an inverter 42, receives a three phase AC input 44. The converter converts the three-phase AC input 44 to a DC power that provides a DC bus 46 for inverter 42. As described above with respect to FIG. 1, the inverter is preferably a PWM inverter and synthesizes AC voltage waveforms with a fixed frequency and amplitude for delivery to the non-motor load through an LC network and transformer, collectively shown at block 48. To prevent saturation of the transformer during motor drive start-up, controller 32, FIG. 1, receives current feedback via current sensors 50 for each phase of a three-phase output of inverter 42 that is fed to transformer 48. The current sensors 50 may include transducers or equivalent components to measure the phase currents, $I_a$, $I_b$, and $I_c$. It is understood that just two of the motor drive currents may be sampled and, thus, the third phase value can be deduced from the simultaneous measurement of the other two currents. The controller then carries out a Clarke or equivalent transform 52 on the current measured at each phase. The Clarke transform 52 converts the three-phase current readings measured from the inverter output to direct and quadrature current vector values, $I_d$ and $I_q$. A Park transform 54 is then carried out using the current vector values, $I_q$ and $I_d$, together with a value of angular position, $\theta$, to determine q-axis and d-axis DC current values, $I_Q$ and $I_D$. The controller then carries out a current limit calculation 56 to determine $I_{limit}$ from the $I_Q$ and $I_D$. $I_{limit}$ reflects the total value of current being fed to the transformer and if that current value exceeds a threshold, e.g. 90% of $I_{saturation}$, then the controller adjust operating parameters of the motor drive and, specifically, the inverter 42. $I_{saturation}$ corresponds to the total input current level at which the transformer will saturate for a given voltage at a given frequency; see Eqn. 1.

If the total instantaneous input current level to the transformer exceeds the given threshold, the controller, as will be described more fully below, adjusts the V/Hz profile 58 along which the motor drive is being controlled to operate. In this regard, the controller, based on the V/Hz profile, determines a reference voltage, $V_{reference}$, that is input to a voltage regulator 60. Voltage regulator 60, which receives load voltage feedback from an RMS voltmeter 61, is designed to coordinate $V_{reference}$ with the load voltage such that a desired load voltage is provided. In this regard, the invention includes a control loop that is first closed on the load voltage. In other words, the V/Hz profile defines what voltage will be provided as a function of frequency, but control is first governed by what output voltage is required/desired by the load. In this regard, the controller causes the motor drive to provide power at an output voltage that is matched to frequency and, as such, the voltage demanded from the motor drive will coincide with frequency of the AC outputs of the inverter. In an alternate embodiment, the controller causes the motor drive to provide the rated voltage of the load, but the maximum voltage provided at a given instant of time will be limited to not exceed the voltage corresponding to the frequency of the inverter output signals at that given instant of time, as established by the V/Hz curve.

In this regard, the voltage regulator 60 provides a command signal to space vector control 62 that determines corresponding voltage vector values, $V_d$, $V_q$, and $\theta$. These voltage vector values are then input to a space vector PWM control block 64 that controls switching of the IGBTs of the inverter 42. That is, the controller determines switching times for the IGBTs that will provide a desired output voltage, but prevent current saturation of the transformer 48.

Figure 3:
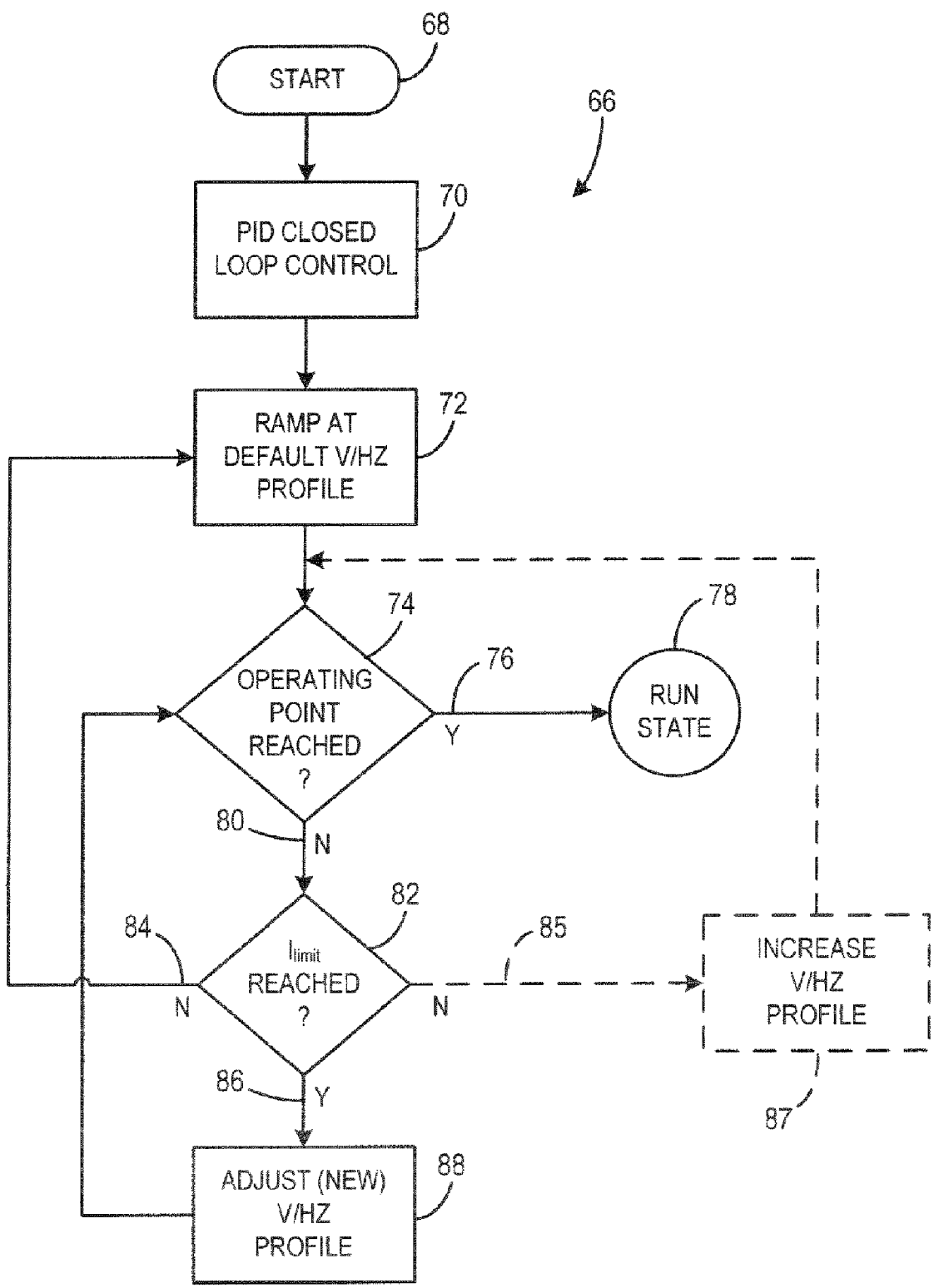
FIG. 3 is a flow chart setting forth the steps of a motor drive start-up control technique in accordance with the present invention.

Referring now to FIG. 3, the steps of a control technique for operating a motor drive such that transformer saturation does not occur are set forth. The technique 66 begins with the initialization of motor drive operation at 68. In this regard, the motor drive is initially caused to operate according to default V/Hz curve or profile. The rated V/Hz for the motor drive is also established as is a desired current limit for the inverter output. It is recognized that the rated V/Hz and desired current limit can be hard values for the motor drive or dynamically determined given the specific contextual application of the motor drive. Upon motor drive start-up, the initialization parameters will initially govern operation of the motor drive.

Following initialization 68, the controller executes a closed loop control 70. This closed loop voltage control 70, as described above, establishes that subsequent control of the motor drive will be dependent upon the motor drive providing a desired output voltage. In this regard, the closed loop voltage control monitors whether the voltage at the load corresponds to the voltage that should be provided according to the current V/Hz curve. As such, it is understood that throughout the control technique, load voltage is being monitored and if the load voltage deviates from what is desired, separate control algorithms may be executed to reduce the difference between actual load voltage and target voltage.

The motor drive is initially caused to ramp up voltage as a function of frequency according to the default V/Hz profile 72. As such, the motor drive will provide a generally linear increase in output voltage as a function of increase in frequency. That is, at the moment of start-up, frequency is at 0 Hz, but after start-up, the motor drive will ramp up to provide power at a rated frequency, such as 60 Hz. As the motor drive is ramping up according to the initial or default V/Hz profile, the controller receives feedback to determine if the motor drive has reached the target operating point 74, e.g. providing power of 460V at 60 Hz. If so 74, 76, the controller will control the motor drive to operate according to one or more steady-state control algorithms 78 and control technique 66 is complete.

On the other hand, if the operating point has not been reached 74, 80, the controller through current feedback received from the output of the inverter of the motor drive, as described with respect to FIG. 2, determines if a current limit has been reached 82. If not 82, 84, the control technique re-loops to step 72 and the motor drive is caused to operate according to the default V/Hz profile until either the operating point is reached or the current limit exceeded. Alternately 85, rather than return to step 72, the controller can control the motor drive according to a new V/Hz profile that is steeper than the default profile. In this regard, the motor drive can be driven more rapidly to the operating point.

When the current limit has been reached 82, 86, the controller causes the motor drive to operate according to a new V/Hz profile 88. The current limit represents a fraction of the maximum desirable output current of the inverter. In this regard, the controller will change operation of the motor drive before a saturation current is present. Accordingly, the new V/Hz profile has less slope than the initial or default V/Hz profile. The new V/Hz profile is designed, like to the initial default profile, to ramp up motor operation to the rated voltage and frequency, but will cause that ramping to occur at a reduced rate. Once the new V/Hz profile has been implemented the control technique returns to step 74 and will maintain operation along the new V/Hz profile until the desired operating point is reached or yet another new V/Hz profile is needed. That is, it is contemplated that several V/Hz profiles may be used to govern operation of the motor drive before the desired operating point is reached. Additionally, it is contemplated that the V/Hz profiles may cause a linear or non-linear change in voltage as a function of frequency. In this regard, it is contemplated that a number of mathematical functions may be used to characterize a given V/Hz profile for a given motor drive. For example, it is contemplated that one V/Hz profile may define inverter operation such that the controller causes a ramping up to the rated frequency, e.g. 60 Hz, without ramping up the output voltage. As such, output voltage may be quickly increased to the rated operating point after the rated operating frequency has been reached.

It is also contemplated that the new V/Hz profile may have a negative slope. That is, if the inverter output current has reached the current threshold, it is recognized that a V/Hz profile with a negative-going slope may be used to lower the voltage output of the inverter. As transformer flux is a function of voltage, as set forth in Eqn. 1, lowering the voltage seen by the transformer will reduce the flux in the transformer as frequency remains constant or increases. In this regard, the negative sloped V/Hz profile may be used to govern operation of the inverter until the inverter output current is below the threshold or, alternately, for a pre-set period of time of sufficient length to cause a reduction in the transformer flux. As such, once the inverter output current is below the current threshold, the controller will use a positive-sloped V/Hz profile to ramp the inverter to its rated operation.

Additionally, it is contemplated that more than one current threshold may be used. That is, a first threshold, e.g. 60% of saturation current, may be used to define a point of transition from a steeper positive-sloped V/Hz profile to a flatter, but positive-sloped V/Hz profile. In this regard, when the first threshold is reached, the V/Hz profile will still result in an increase in voltage, but that rate of increase will be reduced and be maintained until either a second threshold, e.g. 90% of saturation current, or the desired operating point is reached. If the second threshold is reached before the operating point, the controller preferably then utilizes a negative-sloped V/Hz profile to cause a reduction in output voltage and, thus, transformer flux. As described above, the negative-sloped V/Hz profile will be used briefly to cause a step-down in output voltage followed by a return to a positive-sloped V/Hz profile to drive the inverter to the operating point.

Figure 4:
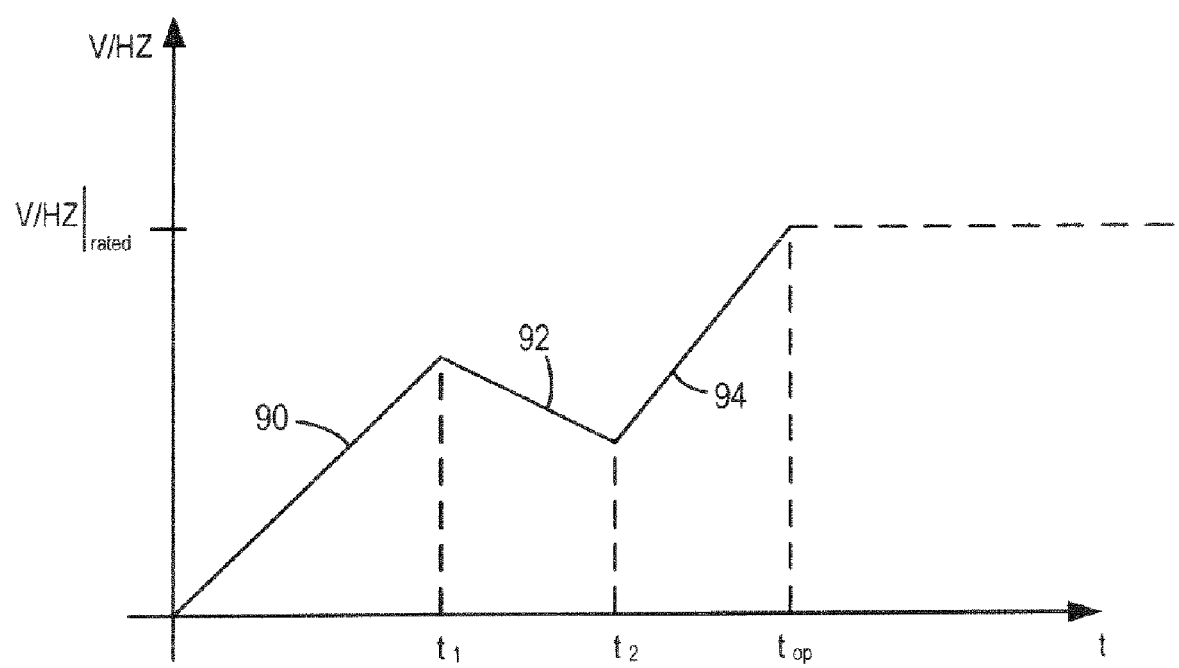
FIG. 4 is a graph illustrating exemplary V/Hz profiles for a given motor drive along which the motor drive may be controlled to follow during start-up.

Exemplary profiles along which a motor drive can be controlled to operate are illustrated in FIG. 4. As shown, at motor drive start-up ($t_0$), an initial V/Hz profile 90 defines motor drive operation. In this regard, the controller will control switching of the IGBTs of the motor drive inverter so that an output voltage as a function of frequency follows V/Hz profile 90. As described above, the controller will receive voltage feedback from the load to monitor that load voltage does match the V/Hz profile. If it does not, the controller will execute appropriate corrective measures, however, it is preferred that the V/Hz profile that governs operation not be adjusted. The controller also receives three-phase current feedback from sensors clamped to the output of the motor drive inverter and from that current feedback determines a total current value. In FIG. 4 it is assumed that the inverter output current reaches near saturation levels at $t_1$ when operation is governed by the initial profile 90 and, as such, at $t_1$ a new V/Hz profile 92 is used to define motor drive operation. As illustrated, profile 92 is a negative-sloped profile that will result in a drop of output voltage and, thus, a reduction in transformer flux. At $t_2$ the controller returns to controlling the inverter to operate according to a positive-sloped V/Hz profile 94. That profile may have the same, less, or more slope than the initial profile 90. In this regard, the motor drive will be driven toward the steady-state operating point or its rated voltage and frequency levels. In the example of FIG. 4, it is assumed that only three V/Hz profiles were required to reach the operating point; however, it is contemplated that less than three or more than three profiles may be needed for a given motor drive application. In any event, once the desired operating point has been reached at $t_{op}$, the motor drive is controlled to operate according to one or more steady-state algorithms.

Therefore, the present invention includes a motor drive configured to supply power to a non-motor load and, during start-up, supply power to the load according to a given V/Hz profile. The motor drive includes an inverter designed to provide power to a load and a controller operationally connected to control operation of the inverter. The controller is configured to cause the inverter to operate at motor drive start-up according to a default V/Hz profile and receive feedback of load voltage during motor drive start-up and control operation of the inverter to reduce a difference between load voltage and a desired load voltage. The controller is further configured to receive feedback of inverter output current, and if the inverter output current exceeds a threshold, cause the inverter to operate according to a new V/Hz profile different from the default V/Hz profile. Otherwise, the controller causes the inverter to operate according to the default V/Hz profile.

A power conditioner is presented and designed to supply conditioned power to a load. The power conditioner includes a DC bus, an inverter connected to the DC bus, and a transformer connected to the inverter. The transformer step-ups an output of the inverter and provides the stepped-up output to the load. The power conditioner further includes a controller that receives feedback of inverter output current and regulates the inverter to prevent current saturation of the transformer during transition of the power conditioner from an initial state to steady-state.

A method of regulating power to a load is also disclosed and comprises the steps of initially providing power to a load according to a default V/Hz profile and monitoring output current of an inverter of a motor drive connected to the load. The method further includes the step of causing the inverter to provide power according to a new V/Hz profile if the output current of the inverter exceeds a current limit.

The present invention has been described in terms of the preferred embodiment, and it is recognized that equivalents, alternatives, and modifications, aside from those expressly stated, are possible and within the scope of the appending claims.

What is claimed is:

1. A motor drive configured to supply power to a load and, during start-up, supply power to the load according to a given V/Hz profile, the motor drive comprising:
    an inverter designed to provide power to a load; and
    a controller operationally connected to control operation of the inverter, the controller configured to:
        cause the inverter to operate at motor drive start-up according to a default V/Hz profile;
        receive feedback of load voltage during motor drive start-up and control operation of the inverter to reduce a difference between load voltage and a desired load voltage;
        receive feedback of inverter output current; and if the inverter output current exceeds a threshold,
        cause the inverter to operate according to a new V/Hz profile different from the default V/Hz profile; otherwise
        cause the inverter to operate according to the default V/Hz profile.

2. The motor drive of claim 1 wherein the load is one of a non-motor load, a motor load, a transformer coupled load, a line voltage and frequency load, a linear load, and a non-linear load.

3. The motor drive of claim 2 wherein the desired load voltage is a fixed voltage and wherein the controller is further configured to control operation of the inverter to provide an output voltage substantially equal to the fixed voltage independent of frequency.

4. The motor drive of claim 1 wherein the new V/Hz profile has less slope than that of the default V/Hz profile.

5. The motor drive of claim 1 connectable to a step-up transformer, and wherein the controller is further configured to adjust operation of the inverter to prevent transformer saturation.

6. The motor drive of claim 1 wherein the inverter is designed to provide an output voltage of at least 370V at 60 Hz during steady-state.

7. The motor drive of claim 6 wherein the default V/Hz profile is 370V/60 Hz.

8. The motor drive of claim 1 wherein the load is a medical imaging scanner.

9. The motor drive of claim 1 wherein the controller includes a proportional-integral-derivative (PID) controller.

10. The motor drive of claim 1 wherein the load is a non-linear load.

11. A power conditioner to supply conditioned power to a load, the power conditioner comprising:
    a DC bus;
    an inverter connected to the DC bus;
    a transformer connected to the inverter and configured to step-up an output of the inverter and provide the stepped-up output to a load;
    a controller that receives feedback of inverter output current and regulates the inverter to prevent current saturation of the transformer during transition of the power conditioner from an initial state to steady-state; and
    a voltmeter designed to provide feedback, in a closed voltage loop, to the controller regarding load voltage, and wherein the controller is further configured to control operation of the inverter to reduce a difference between actual load voltage and a desired load voltage.

12. The power conditioner of claim 11 wherein the transformer is designed to receive a three-phase input, and further comprising at least three current sensors configured to provide feedback to the controller of inverter output current.

13. The power conditioner of claim 11 wherein the load is one of a non-motor load, a motor load, a transformer coupled load, a line voltage and frequency load, a linear load, and a non-linear load.

14. The power conditioner of claim 11 wherein the inverter includes a plurality of IGBTs and anti-parallel diodes.

15. The power conditioner of claim 11 wherein the controller is further configured to cause the inverter to operate according to a default V/Hz profile during start-up and if inverter output current exceeds a current limit, cause the inverter to operate according to a new V/Hz profile that results in a less rapid rate of change in voltage per Hz than the default V/Hz profile.

16. The power conditioner of claim 11 wherein the controller is further configured to cause the inverter to increase output voltage linearly as a function of frequency.

17. A method of regulating power to a load comprising the steps of:
    initially providing power to a load according to a default V/Hz profile;
    monitoring output current of an inverter of a motor drive connected to the load;
    causing the inverter to provide power according to a new V/Hz profile if the output current of the inverter exceeds a current limit; and
    receiving feedback of load voltage to control the inverter to provide power at a voltage that at least approximates a target output voltage.

18. The method of claim 17 further comprising the step of providing power with a V/Hz profile that has a negative slope if the output current of the inverter exceeds the current limit.

19. The method of claim 17 further comprising the step of dynamically controlling operation of the inverter with a PID controller.

20. The method of claim 17 wherein the motor drive is an ASD motor drive and the load is a non-motor load.

21. The method of claim 20 wherein the non-motor load is a medical imaging scanner.

22. The method of claim 21 wherein the medical imaging scanner is one of a CT scanner and an MR scanner.

23. The method of claim 17 further comprising the step of receiving feedback of load voltage from an RMS voltmeter.

24. A load power control system comprising:
- an inverter controlled by a voltage regulator, the inverter adapted to receive an input power and to provide an output power;
- at least one current sensor connected to sense output current of the inverter and provide feedback thereof a transformer coupled to the inverter to provide the inverter output power to a load;
- a voltage sensor connected to sense load voltage and provide feedback thereof;
- a controller programmed to:
  - receive the feedback of the at least one current sensor throughout a load start operation;
  - determine whether the feedback exceeds a current threshold;
  - if the feedback does not exceed the current threshold, output a V/Hz profile having a default value;
  - if the feedback exceeds the current threshold, output a V/Hz profile having an adjusted value;
- the voltage regulator connected to receive the load voltage feedback of the voltage sensor and the V/Hz profile of the controller during the load start operation, and adapted to regulate a voltage and maintain a frequency of the inverter output power in accordance with the V/Hz profile to drive the feedback load voltage towards a desired load voltage throughout the load start operation.

25. A method for regulating a load power during a load start, the method comprising:
- sensing a closed loop load voltage with a voltage sensor and a closed loop inverter current with a current sensor;
- ramping V/Hz profile of an inverter output according to a default V/Hz profile until the closed loop load voltage reaches an operating voltage; and
- during the ramping, adjusting the V/Hz profile based on the sensed closed loop voltage if the closed loop inverter current exceeds a limit.

* * * * *

UNITED STATES PATENT AND TRADEMARK OFFICE
CERTIFICATE OF CORRECTION

PATENT NO. : 7,468,595 B2 Page 1 of 1
APPLICATION NO. : 11/161200
DATED : December 23, 2008
INVENTOR(S) : Lee et al.

It is certified that error appears in the above-identified patent and that said Letters Patent is hereby corrected as shown below:

Col. 11, line 6 (Claim 24), after "thereof", insert a --;-- and a return for a new paragraph before "a trans-".

Signed and Sealed this

Third Day of March, 2009

JOHN DOLL
*Acting Director of the United States Patent and Trademark Office*